United States Patent
Rawlings

(10) Patent No.: US 8,210,799 B1
(45) Date of Patent: Jul. 3, 2012

(54) BI-METALLIC STRIP SEAL FOR A TURBINE SHROUD

(75) Inventor: Christopher K Rawlings, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 1087 days.

(21) Appl. No.: 12/059,142

(22) Filed: Mar. 31, 2008

(51) Int. Cl.
*F16J 15/16* (2006.01)

(52) U.S. Cl. ............... 415/135; 415/139; 415/173.1; 277/654

(58) Field of Classification Search ............ 415/136, 415/138, 139, 173.1, 191, 208.1; 277/644, 277/647, 654, 614
See application file for complete search history.

(56) References Cited

U.S. PATENT DOCUMENTS

| | | | |
|---|---|---|---|
| 3,975,114 A * | 8/1976 | Kalkbrenner | 415/210.1 |
| 5,716,052 A * | 2/1998 | Swensen et al. | 277/647 |
| 6,318,732 B1 * | 11/2001 | Hoyes et al. | 277/593 |
| 7,316,402 B2 * | 1/2008 | Paauwe | 277/641 |
| 7,901,186 B2 * | 3/2011 | Cornett et al. | 416/198 A |

* cited by examiner

*Primary Examiner* — Ninh H Nguyen
(74) *Attorney, Agent, or Firm* — John Ryznic

(57) ABSTRACT

A bi-metallic strip seal used to seal the gap between adjacent shroud segments in a gas turbine engine. The bi-metallic strip seal is formed from one or more layers of bi-metallic materials with different coefficients of thermal expansion. In a cold state the bi metallic strip seal will fit within the slot easily, while in the hot state the strip seal will expand to fit tightly within the slot and block leakage flow. The strip seal can be formed with the bi-metallic layers oriented similarly or oppositely in order to control the seal force and deflection properties. In one embodiment, the strip seal is formed from four bi-metallic layers in which the middle is bonded while the adjacent layers are free from shear.

2 Claims, 5 Drawing Sheets

US 8,210,799 B1

BI-METALLIC STRIP SEAL FOR A TURBINE SHROUD

FEDERAL RESEARCH STATEMENT

None.

CROSS-REFERENCE TO RELATED APPLICATIONS

None.

BACKGROUND OF THE INVENTION

1. Field of the Invention

The present invention relates generally to a gas turbine engine, and more specifically to a strip seal between adjacent shroud segments of the turbine.

2. Description of the Related Art including information disclosed under 37 CFR 1.97 and 1.98

In a gas turbine engine, a compressed air from a compressor is burned with a fuel in a combustor to produce a hot gas flow. The hot gas flow is passed through a multiple stage turbine to convert most of the energy from the gas flow into mechanical work to drive the compressor, and in the case of an aero engine to drive a fan, and in the case of an industrial gas turbine (IGT) engine to drive an electric generator to produce electrical power.

The turbine section of the engine is exposed to the high temperature gas flow. A plurality of stages of rotor blades and stator vanes react with the hot gas flow to convert the energy from the gas flow into mechanical energy to drive the rotor shaft. Stator vanes are formed with end walls or platforms on the inner and the outer diameters with the airfoil extending between the end walls to form a flow path through adjacent vanes for the hot gas stream or flow in the turbine. The stator vanes are formed of one, two or sometimes three vanes per segment in which several segments are placed around the turbine to form a complete annular vane stage. Adjacent vanes require a seal placed within grooves on the end wall faces to form a seal in the space between adjacent vane end walls. The space will be large during the turbine cold condition and decrease as the engine heats up during startup until a steady state is reached.

Gas turbine engines use strip seals between adjacent static components such as ring segments, casing components and stator vanes. Strip seals are long, ruler like seals that fit into aligned slots in each adjacent component. FIG. 1 shows this prior art strip seal. The seal must be smaller than the slot to enable assembly of the components and allow for machining variations such as seal slot misalignment and undersized slots. In the absence of a high pressure gradient to load the seal, the failure to positively engage the components results in increased seal wear due to engine vibration or aero flutter or increase leakage flow across the seal.

BRIEF SUMMARY OF THE INVENTION

It is an object of the present invention to provide for a strip seal which will be easy to install in the cold condition yet provide a sufficient seal during the hot or normal operating condition of the shroud segments.

It is another object of the present invention to provide for a strip seal that will decrease the flow leakage across the seal over the prior art strip seals.

It is another object of the present invention to provide for a strip seal that will decrease the seal wear due to engine vibration or aero flutter over the prior art strip seals.

The present invention is a bi-metallic strip seal made of up two metals with different thermal expansion coefficients that are bonded together. The bi-metallic strip seal is sized to easily fit within the slots of the shroud segments of the turbine. When the metal temperature changes, the metals expand/contract differently, resulting in deflection of the bi-metallic strip seal. A broad range of deflection levels can be achieved by altering the material thickness and expansion coefficients. Several layers of bi-metallic materials can be used to produce a tighter fit within the slots to reduce leakage flow across the strip seal and to reduce the wear of the strip seal due to vibrations or flutter.

DETAILED DESCRIPTION OF THE INVENTION

Figure 1:
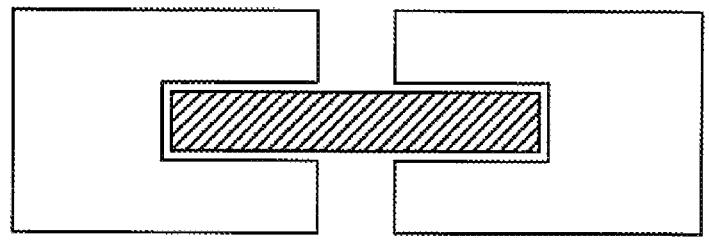
FIG. 1 shows a prior art strip seal used in shroud segment slots.
Figure 2:
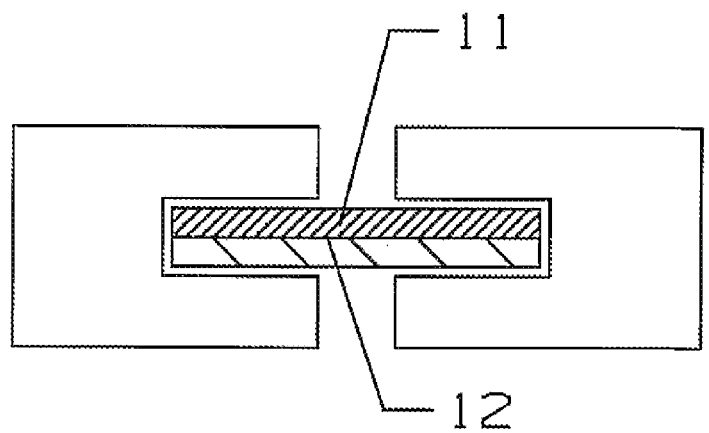
FIG. 2 shows a first embodiment of the bi-metallic strip seal of the present invention in the cold condition.

The present invention is a bi-metallic strip seal having one or more layers of bi-metallic stacks bonded together in the center and used to seal the slots in adjacent shroud segments of a gas turbine engine. The strip seals in a gas turbine engine must provide adequate sealing from engine startup (the cold condition or state), through the steady state condition, and through the engine shut down condition while maintaining the sealing capability all through these stages. The basic form of the bi-metallic strip seal of the present invention is shown in FIG. 2 in the cold condition. This seal is formed on one layer of bi-metallic materials that include a first metal 11 and a second metal 12 in which the coefficient of thermal expansion of the first metal 11 is greater than the coefficient of thermal expansion of the second metal 12. The two metals 11 and 12 are bonded together along the entire contacting surface.

Figure 3:
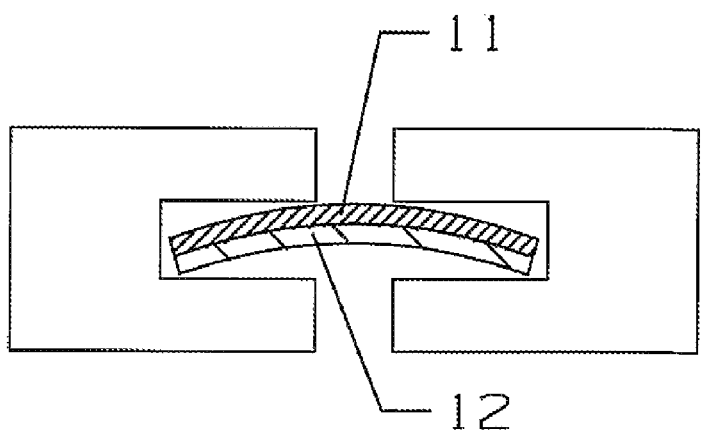
FIG. 3 shows a first embodiment of the bi-metallic strip seal of the present invention in the hot condition.

The b-metallic strips are comprised of two metals with different thermal expansion coefficients that are bonded together along the contact faces. When the metal temperature changes, the metals expand/contract differently, resulting in deflection of the bi-metallic strip as seen in FIG. 3. A broad range of deflection levels can be achieved by altering material thickness and expansion coefficients. One metallic material has a relatively low coefficient of thermal expansion while the second metallic material has a relatively high coefficient of thermal expansion such that the bending results shown in the figures can be obtained in order to provide for a lose insertion at the cold state while fitting tightly within the slots during the hot condition.

In a gas turbine engine, components are generally assembled at room temperature. During operation, common seal operating temperatures range from 600 F to 1000 F. by designing a bi-metallic strip seal (made from a composite of dissimilar metals), the seal will distort during operation. This feature enables assembly of the seal within the slots at room temperature, and positive seating of the seal in the slots during engine operation. Advantages of the present invention include reduced leakage flow and reduced seal wear due to vibration or flutter.

Figure 4:
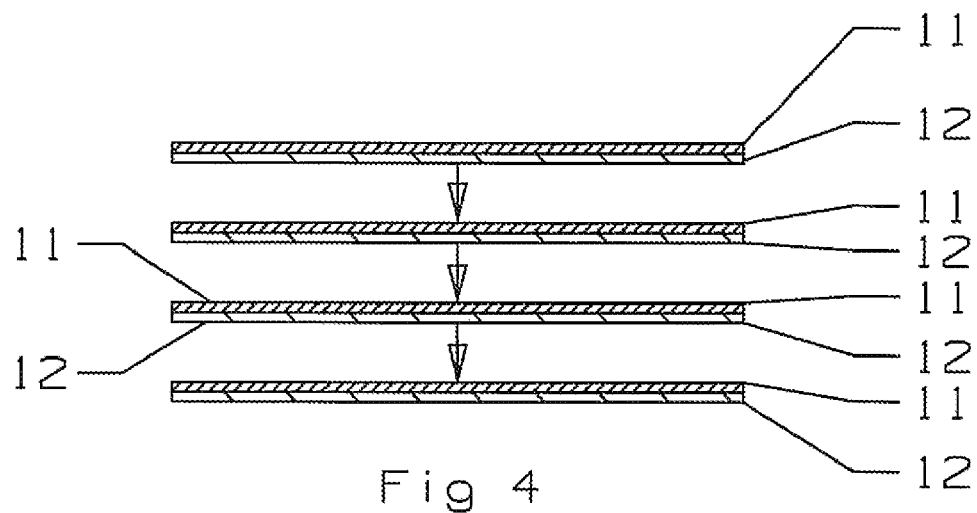
FIG. 4 shows a second embodiment of the bi-metallic strip seal with four layers in the unassembled condition.
Figure 5:
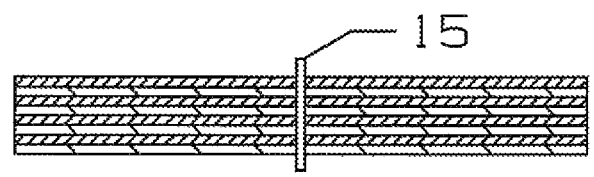
FIG. 5 shows a second embodiment of the bi-metallic strip seal with four layers in the assembled condition.
Figure 6:
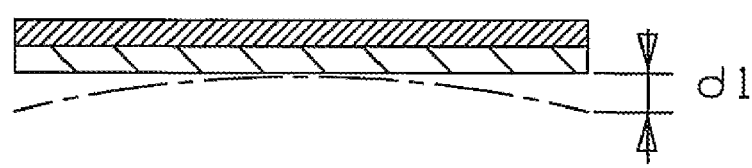
FIG. 6 shows a thick bi-metallic strip seal with low distortion.
Figure 7:
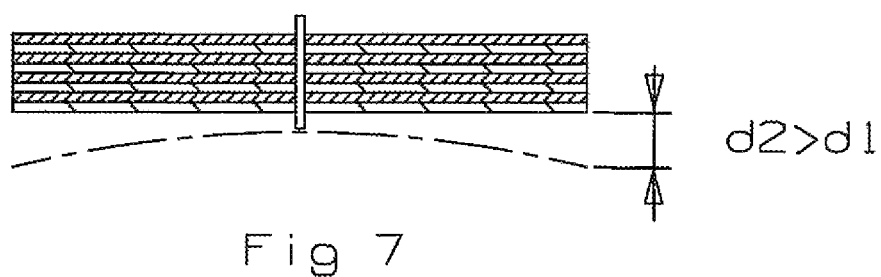
FIG. 7 shows a multiple layered bi-metallic snip seal with high distortion due to the multiple stacks.

The level of deflection is controlled by material selection and material thickness. Deflection level increases as the seal becomes thinner. One method of achieving high distortions while maintaining seal mass is to create a composite seal compromised of several unconstrained layers of bi-metallic strips as seen in FIGS. 4 and 5. In FIG. 4, the strip seal is formed from four layers of bi-metallic strips 11 and 12 and bonded together at the center by a pin, a bolt or a weld 15. The pin, bolt or weld 15 secures the eight layers together at the center while allowing the layers to slid freely over each other. The method used to bind the stack of seal strips together must allow for free shear between adjacent strips. A single pin/bolt/weld is appropriate. Bonding the entire contact surface between strips (such as by distributed bolting or brazing) will prevent deflection of the strip seal. FIG. 6 shows the deflection of a bi-metallic strip seal of the present invention with one layer of two bi-metallic materials. The deflection of the bi-metallic strip seal having four bi-metallic layers with the same total seal thickness is shown in FIG. 7. The deflection of the four bi-metallic layers in FIG. 7 is greater than the deflection of the FIG. 6 seal even though both seals having the same over-all thickness. This is the result of the multiple bi-metallic layers that allow for free shear between adjacent layers.

Figure 8:
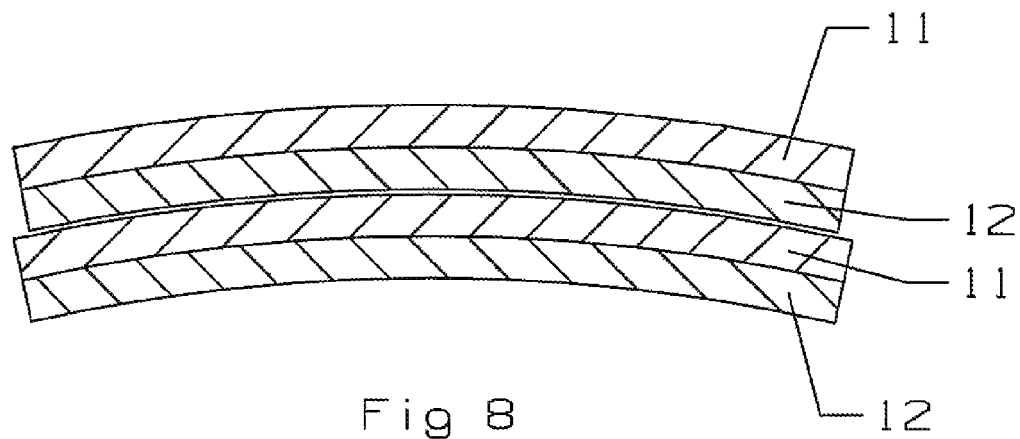
FIG. 8 shows a bi-metallic strip seal with similar orientation of the bi-metallic strips.
Figure 9:
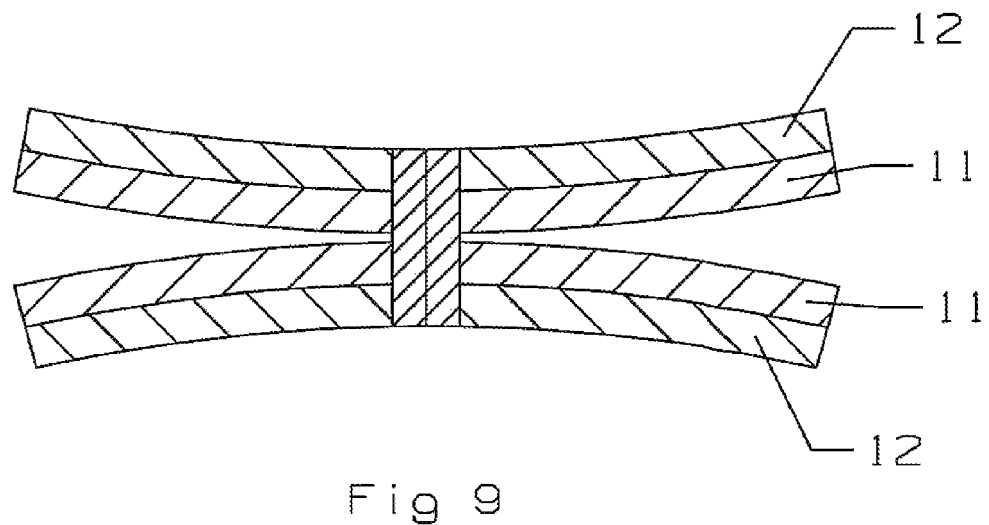
FIG. 9 shows a bi-metallic strip seal with opposite orientation of the bi-metallic strips.

FIG. 8 and FIG. 9 show the strip seal distortion force levels that can be controlled by the orientation of the bi-metallic strips 11 and 12. in FIG. 8, two bi-metallic layers are used with the same orientation of metal 11 on top of metal 12. The adjacent layers are in free shear like is FIG. 5. This orientation produces a force of 2× and a seal deflection of 1×. FIG. 9 shows a seal strip with two bi-metallic layers but with the two middle layers 11 to be a common metal while the two outer layers 12 to be a common metal. The resulting deflection is shown in FIG. 9 and has a force of and a seal deflection of 2×.

Figure 10:
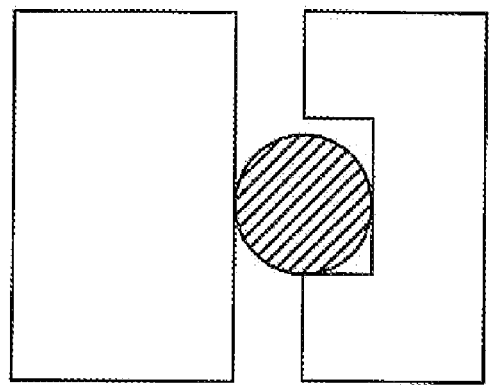
FIG. 10 shows a prior art rope seal.

Gas turbine engines also use face seals to seal the gap between adjacent components such as ring segments, casing components and stator vanes that undergo moderate relative movement. Common types of face seals include a ceramic rope seal of FIG. 9 and the stein style seal of FIG. 10. The limitations of these seals are difficult to assembly and re-assemble the components, high cost of the stein seal, or limited durability of the ceramic rope seal.

Figure 11:
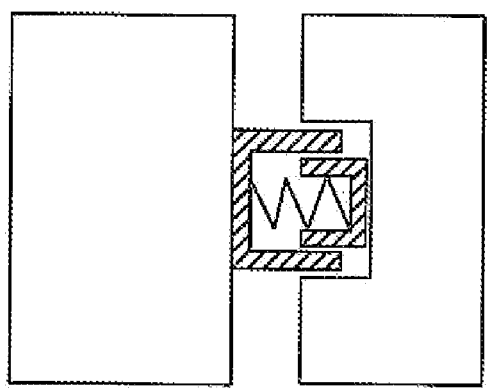
FIG. 11 shows a prior art Stein style seal.
Figure 12:
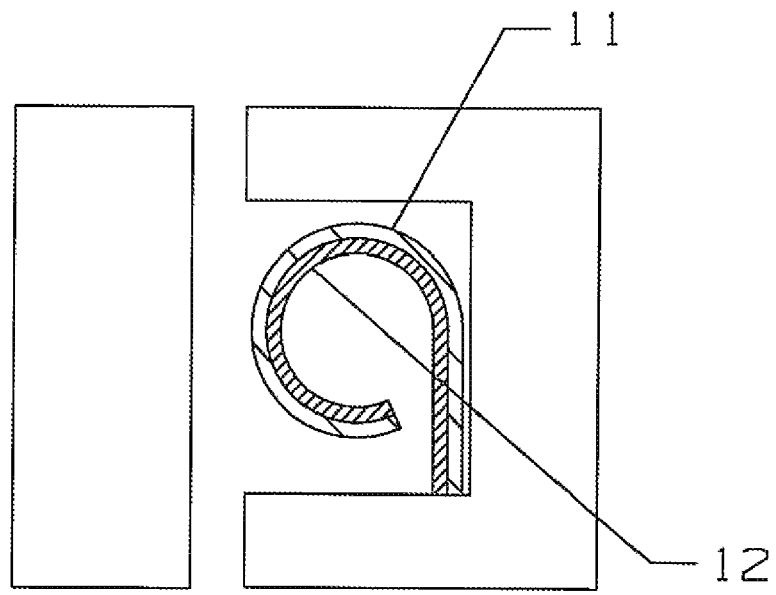
FIG. 12 shows a bi-metallic face seal of the present invention in the cold state.
Figure 13:
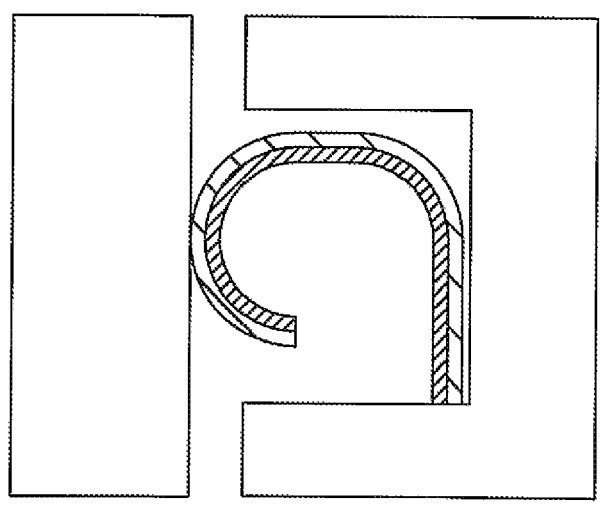
FIG. 13 shows a bi-metallic face seal of the present invention in the hot or operating state.

In order to eliminate these limitations and improve the seal, the present invention proposes a bi-metallic face seal as shown in FIG. 11 in the cold state. The bi-metallic face seal is made from two layers of dissimilar metals 11 and 12 such that the face seal will distort during operation. The face seal is curled in the cold state such that the face seal will fit within the slots easily. This feature enables easy assembly of the strip face at room temperature, and positive engagement of the face seal during engine operation as seen in FIG. 12. In addition to easy assembly, advantages of this concept include a solid metallic construction that improves leakage/durability relative to the rope seal and simplicity that reduces the seal cost relative to the stein seal.

I claim the following:

1. A bi-metallic face seal comprising:
a first metallic material having a relatively low coefficient of thermal expansion;
a second metallic material having a relatively high coefficient of thermal expansion; and,
the first and the second metallic layers being bonded together along their contact surfaces and forming a circular arrangement such that in a cold state the face seal has a relatively small diameter and in a hot state the face seal has a relatively large diameter that makes contact with an opposite surface.

2. The bi-metallic face seal of claim 1, and further comprising:
the face seal includes a flat surface for abutment against a first slot surface, and the face seal includes a curved surface for abutment against a second slot surface.

* * * * *